US006638883B2

(12) United States Patent
Gaffney et al.

(10) Patent No.: US 6,638,883 B2
(45) Date of Patent: Oct. 28, 2003

(54) CARBON-MATRIX COMPOSITES, COMPOSITIONS AND METHODS RELATED THERETO

(75) Inventors: John J. Gaffney, North Chelmsford, MA (US); Raymond C. Loszewski, Windham, NH (US)

(73) Assignee: Ballard Material Products Inc., Barnaby (CA)

( * ) Notice: Subject to any disclaimer, the term of this patent is extended or adjusted under 35 U.S.C. 154(b) by 124 days.

(21) Appl. No.: 09/916,823

(22) Filed: Jul. 26, 2001

(65) Prior Publication Data

US 2003/0100239 A1 May 29, 2003

Related U.S. Application Data

(60) Provisional application No. 60/220,731, filed on Jul. 26, 2000.

(51) Int. Cl.[7] .................. B22B 27/12; B22B 27/04; D03D 25/00; D03D 15/00
(52) U.S. Cl. ............... 442/181; 428/299.1; 428/299.7; 428/300.4; 442/181; 442/197; 442/212; 442/213
(58) Field of Search .................. 428/299.1, 299.7, 428/300.4; 442/181, 197, 212, 213

(56) References Cited

U.S. PATENT DOCUMENTS

| | | | |
|---|---|---|---|
| 3,676,242 A | 7/1972 | Prentice | 156/62.4 |
| 3,914,395 A | 10/1975 | Finelli et al. | 423/448 |
| 4,100,324 A | 7/1978 | Anderson et al. | 428/288 |
| 4,178,413 A | 12/1979 | DeMunda | 428/408 |
| 4,410,385 A | 10/1983 | Murphy et al. | 156/181 |
| 4,479,999 A | 10/1984 | Buckley et al. | 428/245 |
| 4,539,249 A | 9/1985 | Curzio | 428/175 |
| 4,554,024 A | 11/1985 | Zimmer et al. | 106/284 |
| 4,659,624 A | 4/1987 | Yeager et al. | 428/408 |
| 4,818,318 A | 4/1989 | McMahon et al. | 156/166 |
| 4,871,491 A | 10/1989 | McMahon et al. | 264/29.2 |
| 4,874,563 A | 10/1989 | McMahon et al. | 264/29.2 |
| 4,894,280 A | 1/1990 | Guthrie et al. | 428/224 |
| 4,894,286 A | 1/1990 | Gray | 429/408 |
| 4,925,729 A | 5/1990 | O'Connor | 428/245 |
| 5,000,807 A | 3/1991 | Stuart | 156/166 |
| 5,061,414 A | 10/1991 | Engle | 264/29.5 |
| 5,177,840 A | 1/1993 | Laws | 28/220 |
| 5,187,018 A | 2/1993 | Glemet | 428/474.7 |
| 5,190,809 A | 3/1993 | Marissen et al. | 428/225 |
| 5,508,093 A | 4/1996 | Mehdorn | 428/219 |
| 5,556,704 A | 9/1996 | Prevorsek et al. | 428/408 |
| 5,581,857 A | 12/1996 | Sheehan et al. | 28/113 |
| 5,609,707 A | 3/1997 | Bazshushtari et al. | 156/146 |
| 5,686,027 A | 11/1997 | Olsen et al. | 264/29.7 |
| 5,888,609 A | 3/1999 | Karttunen et al. | 428/107 |
| 5,910,456 A | 6/1999 | Matsuhisa et al. | 442/179 |
| 5,994,480 A | 11/1999 | Wang et al. | 525/523 |
| 6,027,794 A | 2/2000 | Ozaki et al. | 428/297.7 |
| 6,403,504 B1 * | 6/2002 | McMahon et al. | 442/197 |

FOREIGN PATENT DOCUMENTS

EP 0439184 B1 7/1996

OTHER PUBLICATIONS

Schmidt et al; Evolution of Carbon–Carbon Composites (CCC), Sample Journal 32 (4): 44–50, (Jul./Aug. 1996).

* cited by examiner

Primary Examiner—Terrel Morris
Assistant Examiner—Lynda Salvatore
(74) Attorney, Agent, or Firm—Foley Hoag LLP (57) ABSTRACT

The present invention relates to carbon-matrix composites, such as carbon—carbon composites, and a method for forming them by forming a fabric of fusible and infusible fibers which can be processed and carbonized to form a composite. The methods disclosed herein permit preparation of composites which are particularly thin, uniform, and highly pure. The invention also relates to preprocessed fabrics and precarbonized composites, such as those comprising carbon or oxidized polyacrylonitrile fibers and fusible polyacrylonitrile fibers.

50 Claims, 6 Drawing Sheets

CARBON-MATRIX COMPOSITES, COMPOSITIONS AND METHODS RELATED THERETO

RELATED APPLICATIONS

This application claims the benefit of the filing date of U.S. Provisional Application No. 60/220,731, filed Jul. 26, 2000 and incorporated herein by reference.

BACKGROUND OF THE INVENTION

1. Field of the Invention

The invention relates to carbon-matrix composites, and in particular embodiments, to carbon-matrix composites derived from thermoplastic polyacrylonitrile fibers.

2. Description of the Related Art

Excellent high temperature performance characteristics of carbon composites in structural, frictional, ablative, and thermal insulation applications have caused an ever expanding demand for such materials. Accordingly considerable effort has been extended in recent years towards developing new techniques for the large scale production of such materials for use in nuclear, aerospace, aircraft and industrial fields.

Carbon-matrix composites are materials that are composed of a fibrous reinforcement in a carbonaceous or graphitic matrix. A filler or coating may also be included to impart specialized properties. Carbon-carbon parts, wherein the fibers and the matrix are both carbon-based, have been put to a variety of uses, including aeronautical and space applications, because of their light-weight and high temperature properties. Carbon-carbon composites are light-weight materials, with densities ranging up to about 2.00 $g/cm^3$, depending on the precursors used for their production. Carbon-matrix composites may have greater density, depending on the density of the particular fibrous reinforcement used. Carbon-matrix composites possess great thermal stability in non-oxidizing environments and may be coated with an oxidation-resistant coating for use in oxidizing environments. Carbon-carbon components are also desirable because of their resistance to high temperature and thermal shocks, coupled with high temperature strength.

The carbon fibers in a carbon—carbon composite are generally derived from three main precursors; namely, rayon, polyacrylonitrile (PAN), and pitch. The use of rayon precursor has been largely abandoned in recent years because of the resulting poor quality of the carbon fibers produced. Currently, fiber manufacturers generally use PAN- or pitch-based precursors. PAN is often preferred for high strength, whereas pitch derivatives are desirable for high modulus and high thermal conductivity.

The use of carbon—carbon composites in engine components in the industrial and automotive market has not been extensive, primarily for two reasons. The first is cost of carbon fiber itself. In the early 1990's, carbon fiber cost about $40/lb, and now costs $8–9/lb, and the near term projections are for under $5/lb. This cost reduction and projected increased demand for fibers should drive the fiber cost down further, making the carbon—carbon composites likely to replace steel and aluminum in many applications.

The second reason why carbon-matrix composites, such as carbon—carbon composites, have not achieved great commercial success is the difficulty encountered in trying to optimize and reduce the cost of the fabrication process. In order to yield the desired composite properties, multi-step processing techniques may be utilized to convert the binder into carbon matrix or add carbon matrix via chemical vapor deposition. Traditional processing consists of mixing the fiber with resin and shaping preforms into the desired shape. These shapes or preforms are kept in a high temperature furnace and heat treated for several hours ranging from 800 to 2000° C. After firing, the composites or performs are placed in a CVD furnace and densified. CVD refers to chemical vapor deposition. Due to the nature of CVD, it is extremely difficult to fabricate thick specimens with uniform density. As such, even for thin samples the CVD process can take from a few days to several weeks to finish. The time costs have made these processes highly labor intensive and not conducive to high volume production.

A variety of methods and materials for making carbon—carbon composites are described in numerous publications and patents including, for example, the following: Buckley, John D. and Edie, Dan D., ed., Carbon—Carbon Materials and Composites, Noyes Publications, Park Ridge, N.J. (1993); Delmonte, John, Technology of Carbon and Graphite Fiber Composites, Van Nostrand Reinhold Company, New York, N.Y. (1981); Schmidt et al, "Evolution of Carbon—Carbon Composites (CCC)" SAMPE Journal, Vol.32, No. 4, July/August 1996, pp 44–50; "Expanding Applications Reinforce the Value of Composites" High Performance Composites 1998 Sourcebook; U.S. Pat. No. 3,914,395 to Finelli, et al; U.S. Pat. No. 4,178,413 to DeMunda; U.S. Pat. No. 5,061,414 to Engle; U.S. Pat. No. 4,554,024 to Zimmer, et al; and U.S. Pat. No. 5,686,027 to Olsen, et al.

SUMMARY OF THE INVENTION

The present invention includes carbon-matrix and carbon—carbon composites, and systems and methods for manufacturing such composites. For instance, in certain embodiments, it is an object of the present invention to provide a novel method of making a carbon-matrix composite product in which a precursor substrate is constructed from stabilized carbon precursor reinforcing fibers and thermoplastic fibers. The precursor substrate may be compressed under controlled conditions of, e.g., temperature and pressure to fuse the thermoplastic fibers to the reinforcing fibers, and the precursor substrate may then be carbonized.

Thus, in one aspect the invention provides a composite comprising thermoplastic fibers and stabilized carbon precursor reinforcing fibers, wherein the thermoplastic fibers and the reinforcing fibers are carbonized to yield the composite. In certain embodiments, the reinforcing fibers can comprise oxidized polyacrylonitrile fibers. In certain embodiments, the thermoplastic fibers are high char yield fibers, such as phenolic resin, pitch, epoxy resin, phthalonitrile resin, aromatic acetylene-derived polymer, or unoxidized polyacrylonitrile fibers. In certain embodiments, the thermoplastic fibers comprise unoxidized polyacrylonitrile and, for example, the reinforcing fibers comprise oxidized polyacrylonitrile. In certain embodiments, the fibers have substantially identical lengths, or lengths which differ by at least about 50%, at least about 300%, or at least about 1000%. The thermoplastic fibers and the reinforcing fibers may be provided as substantially individual fibers, or as yarns, e.g., separate yarns, or a yarn comprising thermoplastic and reinforcing fibers.

In a second aspect, the composite may be a woven fabric, which the reinforcing fibers are interwoven with the thermoplastic fibers. Alternatively, the composite may be a non-woven fabric in which the reinforcing fibers are blended with the thermoplastic fibers in a generally non-ordered manner.

In another aspect, the invention provides a composite prepared by combining thermoplastic fibers and stabilized carbon precursor reinforcing fibers, fusing the thermoplastic fibers to the stabilized reinforcing fibers and carbonizing the fibers to produce a composite. In certain embodiments, the method may include stabilizing and/or oxidizing the thermoplastic fibers, preferably prior to carbonizing the fibers. The thermoplastic fibers and the reinforcing fibers may be selected as described above. The reinforcing fibers and thermoplastic fibers may be combined by blending the fibers to form a non-woven fabric. Alternatively, the reinforcing fibers and the thermoplastic fibers can be interwoven to form a woven fabric.

In another embodiment, the invention provides a method for forming a composite comprising stabilizing a plurality of carbon precursor fibers, combining the stabilized carbon precursor fibers with the thermoplastic fibers, fusing the thermoplastic fibers to the carbon precursor fibers, and carbonizing the thermoplastic and the reinforcing fibers to produce a composite. The fibers may be combined to form a woven fabric, wherein the thermoplastic fibers are interwoven with the carbon precursor fibers, or may be combined to form a nonwoven fabric. The thermoplastic fibers and the carbon precursor fibers may be selected as described above. In certain embodiments, the method includes the optional step of stabilizing and/or oxidizing the thermoplastic fibers prior to carbonizing the fibers.

In further aspect, the invention provides a method for preparing a composite by forming a precursor substrate comprising polyacrylonitrile fibers and oxidized polyacrylonitrile reinforcing fibers, fusing the polyacrylonitrile fibers to the reinforcing fibers to form a polyacrylonitrile matrix, and carbonizing the polyacrylonitrile fibers and the reinforcing fibers to form a composite. In certain embodiments, the method includes the optional step of stabilizing and/or oxidizing the polyacrylonitrile fibers prior to carbonizing the fibers. The unoxidized polyacrylonitrile fibers and the oxidized polyacrylonitrile fibers may be provided as substantially individual fibers, or as yarns, e.g., separate yarns, or a yarn comprising thermoplastic and reinforcing fibers. The precursor substrate may be a woven fabric in which the polyacrylonitrile fibers are interwoven with the reinforcing fibers, or a non-woven fabric.

DETAILED DESCRIPTION OF EXEMPLARY EMBODIMENTS

Figure 1:
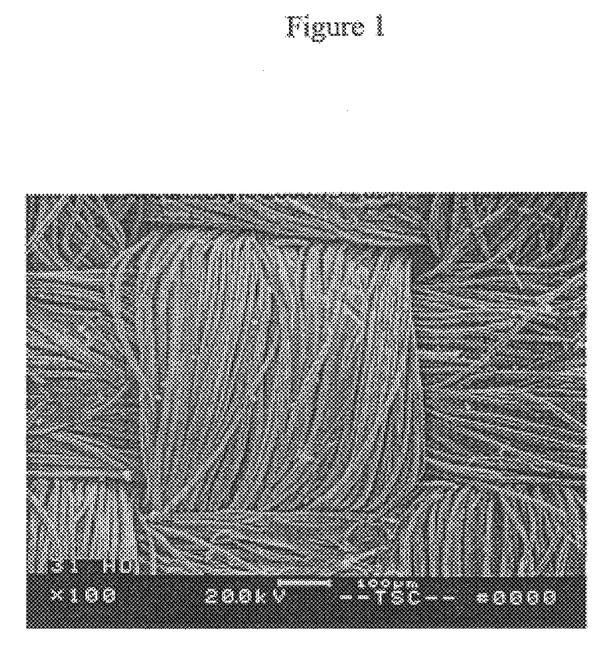
FIGS. 1–3 are scanning electron microscope views of a woven carbon-matrix composite fabric.
Figure 2:
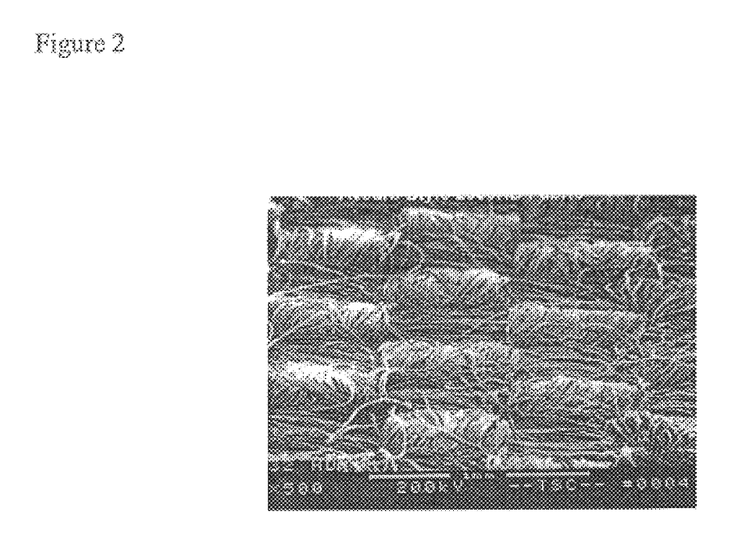
Figure 3:
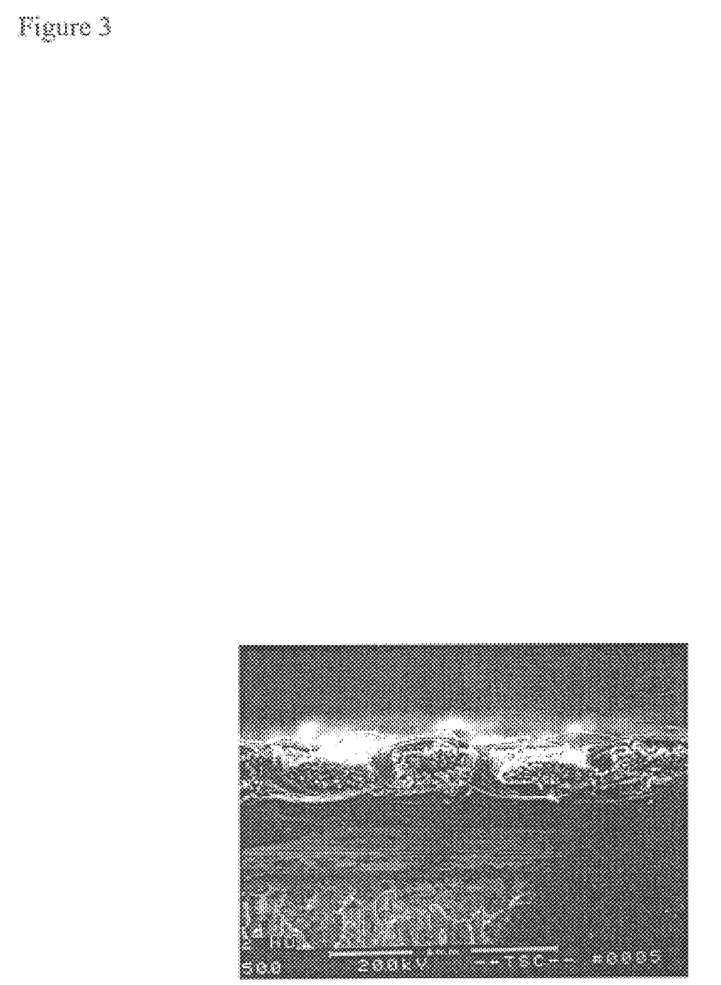
Figure 4:
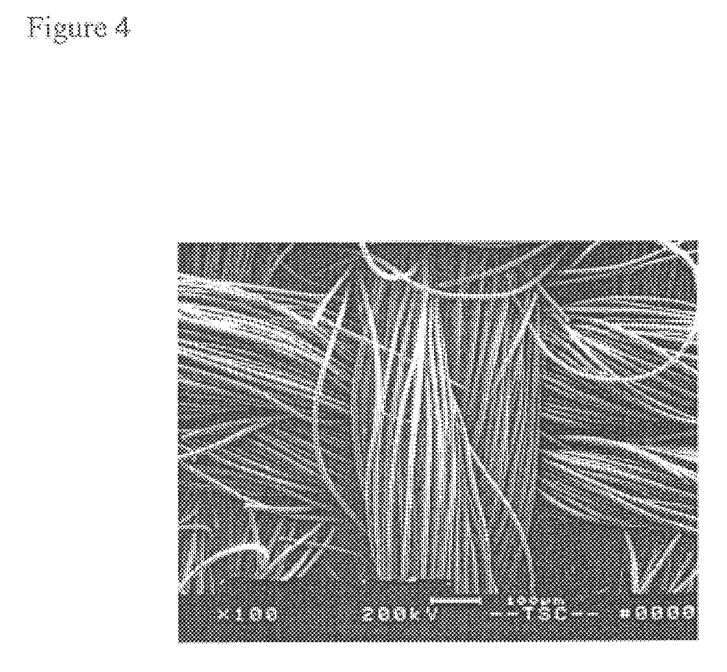
FIGS. 4–6 are scanning electron microscope views of a conventional woven fabric.
Figure 5:
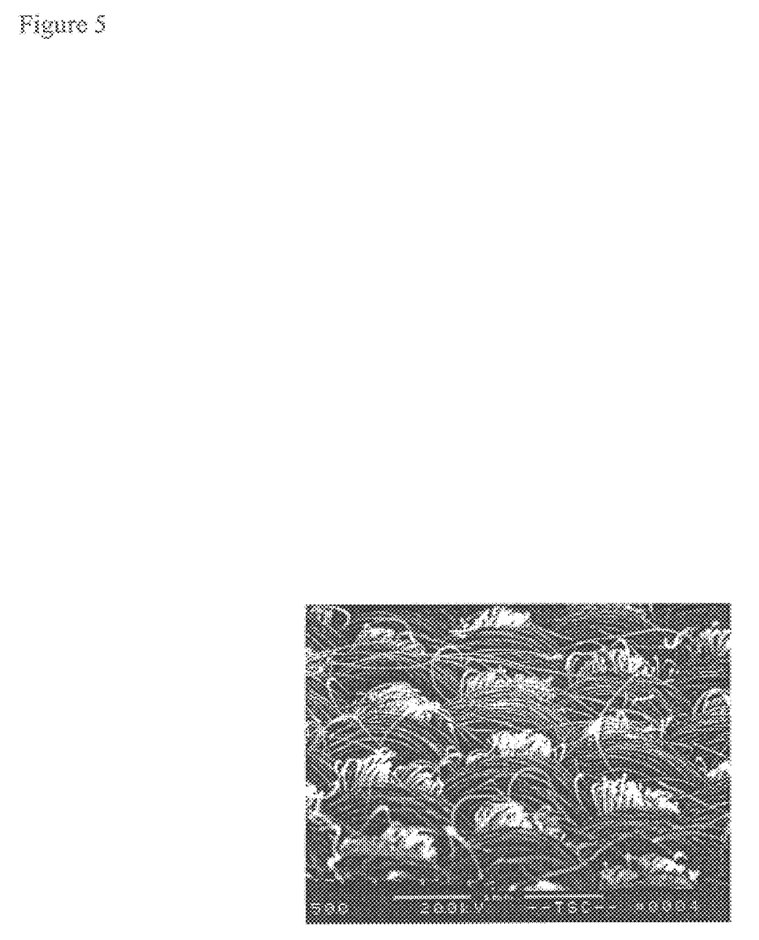
Figure 6:
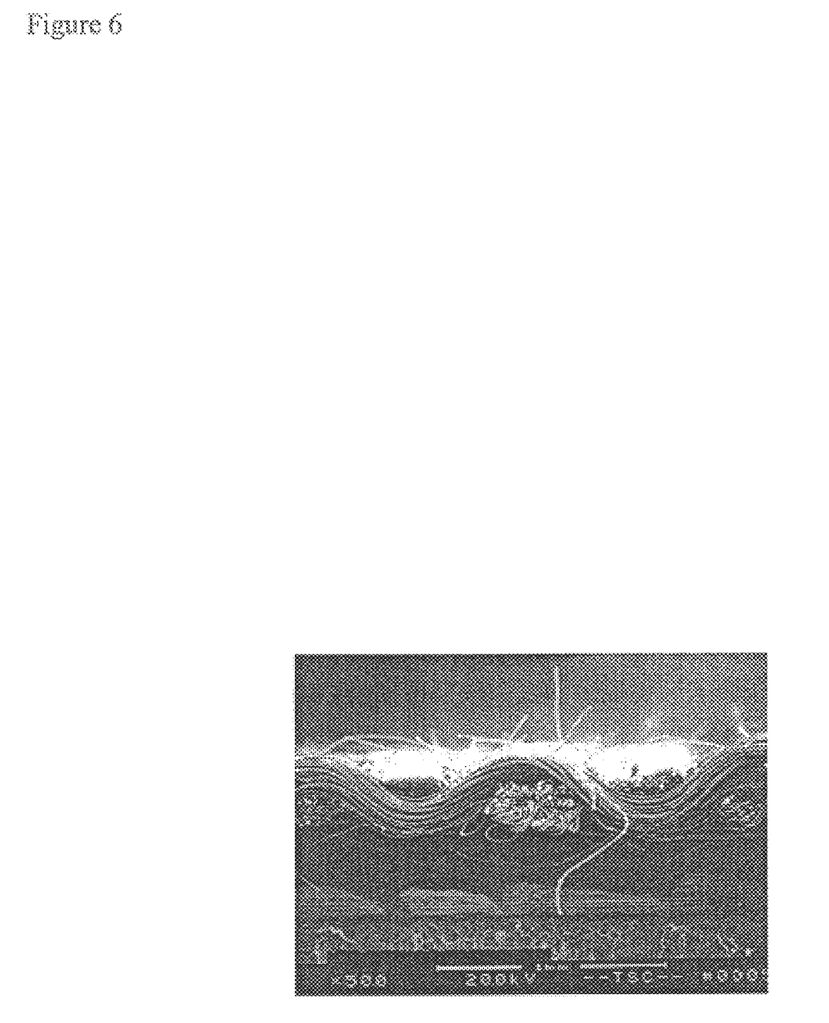

The present invention relates generally to composite materials prepared by combining fusible and infusible fibers into a cohesive fabric, processing the fabric, and carbonizing the material to form a carbon-matrix composite.

One aspect of the present invention relates generally to the preparation of a carbon-matrix composite. In general, the method utilizes a fabric or felt made from a pre-blended combination of fusible matrix and infusible fibrous reinforcement. The infusible fiber reinforcement is the load-bearing element that imparts strength and stiffness to the composite. The role of the matrix is to act as a medium that transfers and distributes loads, keeps fibers properly oriented, and protects them from the environment. These fibers are a load-bearing element of the final material. The composite fabric may be fused, such as by treatment with heat and/or pressure in an amount sufficient for the matrix to fuse (e.g., for the matrix to go through a glass transition phase) and consolidation of the composite to occur. After fusing, the resulting composite may be optionally stabilized by techniques such as heat treatment, irradiation, oxidation, cross-linking, or a combination thereof, and then carbonized.

Thus, the selection of matrix and reinforcing fiber preferably requires that the glass transition temperature for the matrix be less than the melting point of the reinforcing fibers. In certain embodiments, such as where the fusible fibers comprise polyacrylonitrile (PAN) which exotherms during curing processes, the composite preferably utilizes an infusible fiber (e.g., a stabilized carbon precursor such as oxidized PAN).

Preferred composites of the present invention are processed into sheets having thicknesses of less than 10 mm, and even more preferably less than 1 mm.

In preferred embodiments, the subject method is used to produce a carbon-matrix composite with such characteristics as high modulus of elasticity and high tensile strength, low mass, high tensile moduli, and low coefficient of thermal expansion. In certain preferred embodiments, the subject composites have a modulus of elasticity (in the thickness direction) of at least 15 GPa, and more preferably at least 150 GPa. In certain preferred embodiments, the subject composites have a modulus of tensile strength of at least 1 MPa, and more preferable at least 25 MPa.

In certain embodiments, the components and ratios of the subject composition are chosen to provide a product having thermal conductivity of at least 100 W/m-K, and even more preferably 500 W/m-K, 1000 W/m-K or even 2500 W/m-K.

Where the intended use of the subject composites is as friction members, the composites will preferably be prepared so as to have a dynamic coefficient of friction in the range of 0.05 to 0.6.

Where the intended use of the subject composites is as an electrically conductive member, e.g., in a fuel cell, the composite will preferably have an electrical conductance of at least 0.01 S/cm, more preferably at least about 0.1, 1.0, 10 or even 100 S/cm.

Such composites are useful for a wide array of applications, such as wet and dry friction applications, filtration, EMI shielding, static dissipation, structural reinforcement, rocket nozzles and nosetips, ablative applications, electrochemical applications such as a fuel cell substrate, and as a conductive catalyst support, and other applications.

Definitions

Before further description of the invention, certain terms employed in the specification, examples and appended claims are, for convenience, collected here.

As used in this application, the term "carbon-matrix composite" refers generally to composites wherein the matrix is a carbonized or graphitized material. The term "carbon-based composite" refers to any composite wherein the fibrous reinforcement is a carbonaceous or graphitic material. The term "carbon—carbon composite" refers to a composite of carbon fiber in a carbon matrix, i.e., a carbon-matrix composite wherein the fibrous reinforcement comprises carbon fiber.

As used herein, the terms "fibers" and "fibrous material" are used interchangeably herein to refer to any type of fiber, including reinforcing or infusible fibers and thermoplastic or fusible fibers, useful in creating fiber-reinforced composites according to the method disclosed herein. "Substantially independent fibers" are those fibers which are not incorporated into a collective strand, such as a yarn.

The term "fiber content" refers to the amount of reinforcing fiber present, relative to the amount of matrix, in a composite. This is usually expressed as a percentage volume fraction or weight fraction of the composite.

A "woven fabric" is a fabric comprised of fibers arranged in substantially regular patterns or alignment, such as by weaving, knitting, or braiding. Woven fabrics may be formed by interlacing warp and filling threads on a loom, or the like, or by screening a suspension of the fibers to be interwoven.

The term "fabric" refers to woven fabric as well as non-woven fabrics produced by the entanglement of cut fibers by means of needling or hydroentangling. In addition, the term fabric also refers to non-woven webs produced by traditional felt or papermaking technologies where cut fibers are randomly placed onto a carrier belt using water or air as a transfer medium.

The "stabilized" carbon precursor fiber used in the methods and compositions of the present invention refers to fibers formed by suitable stabilization, such as, for example, by oxidation, or other chemical modification of the carbon precursor fibers to yield infusible fibers. For example, polyacrylonitrile (PAN), a fusible thermoplastic carbon precursor, may be stabilized by oxidizing the PAN to yield oxidized PAN, an infusible thermoset material.

The term "glass transition" refers to the transition of a matrix component from a hard or brittle material at low temperatures to a soft, deformable material at high temperatures. The "glass transition temperature", $T_g$, is the temperature at which increased molecular mobility results in significant changes in properties of the cured polymer.

The term "exotherm" as used herein refers to the liberation or evolution of heat from a chemical reaction during the curing of the composite product.

As used herein, a "curing" step involves the irreversible change in properties, such as cross-linking, of the matrix material of the composite by application of heat, pressure, irradiation, chemical reaction or a combination thereof.

The term "electronically conductive material" as used herein means a material having an electronic conductivity of at least about 0.01 Siemens/cm (S/cm) at the operating temperature of the device.

The term "conductance" is used to express the capability of matter to carry electric current. Conductance is quantitatively expressed as the coefficient of proportionality, G, between current intensity I and voltage U at the end of a conductor, I=GU, the conductance being G=I/U. The unit of conductance is the Siemens, $S=\Omega^{-1}$.

The term "Young's modulus" refers to the ratio of normal stress to corresponding strain for tensile or compressive stresses less than the proportional limit of the material. The term can be used interchangeably with "modulus of elasticity".

The "tensile strength" of a composite of the present invention is the nominal stress at which a sample of the material, loaded in tension, separates.

The term "air permeability" refers to the rate of air flow through a material under a differential pressure between surfaces. The air permeability may be measured in terms of air resistance, for example the time in seconds for 300 cc of air to pass through an orifice of area 0.1 square inch. This time in seconds is referred to as a Gurley second or a Gurley-Hill second.

The terms "intermingle" and "intermingling" refer to fibers which are randomly oriented so that there are no distinct or oriented layers of a material or fabric. Processes of intermingling are known to those skilled in the art and include needling and hydroentangling. Both woven and non-woven fabrics or materials may have intermingled fibers.

The term "fusing" as used herein refers to the process of melting the thermoplastic fibers to mechanically interconnect the reinforcing fibers.

A. Composite Fabrics

Suitable reinforcing fibers, also referred to herein as infusible fibers, include glass, carbon, aramid, silicon carbide, aluminum oxide, asbestos, ceramics, graphite, and metal. The reinforcing and/or fusible fibers may have a circular or noncircular cross-section as described in U.S. Pat. No. 5,910,456. Examples of useful reinforcing fibers and fibrous materials are given in U.S. Pat. No. 4,894,286 and U.S. Pat. No. 5,002,750. Reinforcing fibers are generally characterized in that they do not substantially deform under conditions of high heat (e.g., up to 3000° C.) and pressure. Preferably, the reinforcing fibers are stabilized carbon precursor fibers, such as oxidized polyacrylonitrile fibers or oxidized pitch fibers.

Carbon fibers, also referred to herein as organic fibers, have long been known, and methods for their production from a variety of precursors are well described in the art. The term "stabilized carbon precursor fiber" as used herein is meant to include fibers such as are obtained by oxidizing an organic fiber, such as polyacrylonitrile (PAN), rayon, pitch, and the like with air or the like and then carbonizing the fiber under an inert atmosphere usually at 900–1500° C., and if desired, further processing by graphitizing the unoxidized or oxidized fiber at a far elevated temperature, for example, 2000–3000° C. Cellulosic precursors have been used for producing carbon fiber since the early 1960's, with rayon having been the dominant carbon fiber precursor for nearly two decades. More recently, as the art has developed methods for producing carbon fiber derived from such materials as polyacrylonitrile (PAN) and pitch, the importance of rayon-based carbon fiber has declined. Polyacrylonitrile fiber, when oxidized and carbonized under appropriate conditions, provides tough, high strength, high modulus carbon fiber, and the overall conversion yield in producing fiber from PAN is good. Consequently, PAN fiber has been long preferred for fabricating preform structures.

Carbon fiber may also be readily produced from a mesophase pitch by spinning the molten pitch into fiber, oxidizing the pitch fiber by heating in air to form a thermoset fiber, and carbonizing by further thermal treatment in the absence of air. As is well known and understood in the art, the melt-spun pitch filaments are highly ordered structures comprising elongated, liquid crystal mesophase domains aligned with the filament axis. On carbonizing, these domains provide carbon or graphitic fiber with a high degree of crystalline order. Such highly ordered pitch-based fiber has generally been recognized as capable of providing carbon fiber having greater stiffness and higher thermal conductivity than carbon fiber from other sources, and carbon composites with a similar combination of properties and low or even negative coefficient of thermal expansion would find wide application. Moreover, thermoset mesophase pitch fiber is carbonized and graphitized in higher yield than other carbonizable precursor fibers such as rayon fibers, PAN fibers and oxidized PAN fibers, i.e., thermoset pitch fiber undergoes less reduction in weight when thermally processed. This in turn may lead to reduced shrinkage during carbonizing and graphitizing operations and minimize the concomitant creation of voids and internal stresses normally encountered with other fiber precursors. For these reasons, thermoset pitch fiber may also be desirable for use in the practice of certain embodiments of the invention.

The selection of a fibrous material for forming a carbon-matrix composite or carbon—carbon composite is influenced by the desired density for the final product. For example, carbon fiber derived from rayon typically has a density of about 1.42 g/cm$^3$, carbon fiber derived from polyacrylonitrile (PAN) typically has a density of about 1.76 to 1.94 g/cm$^3$, carbon fiber derived from mesophase petroleum pitch typically has a density of about 2.01 g/cm$^3$. The corresponding carbon—carbon composites have a density from about 1.36 to about 2.00 g/cm$^3$. Greater densities may be achieved by using inorganic fibrous material such as ceramic or metal fibers.

The reinforcing fibers may be discrete staple length fibers or may be of a relatively long-length, substantially continuous filamentary form, as appropriate for the desired fabric. For example, it may be advantageous to employ longer fibers in woven fabrics, while shorter fibers may be preferred for nonwoven fabrics. The reinforcing fibers typically have a length greater than 10 mm and preferably greater than 25 mm. In certain embodiments, the reinforcing fibers may comprise fibers which differ in length by at least about 20%, or by at least about 50%.

The thermoplastic fibers may include fibers composed of polyacrylonitrile (PAN), pitch, phenolic resin, phthalonitrile resins, e.g., as disclosed in U.S. Pat. No. 5,965,268, epoxy resin, aromatic acetylene polymers as disclosed in U.S. Pat. No. 5,980,853, or any suitable material which is fusible under conditions of heat and pressure and is carbonizable. In preferred embodiments, the thermoplastic fibers are substantially solid at room temperature, but melt and/or fuse when heated above about 50° C., preferably above at least about 100° C. The polymeric material is preferably selected to be of a kind which, upon heating to an appropriate temperature, yields carbon in greater than 40% of its initial weight when so heated. Stated another way, such materials preferably convert to a material that is at least 50% carbon, preferably at least 60% carbon, still more preferably at least 70% carbon, and most preferably at least 80% carbon by weight. Such materials are referred to herein as high char yield materials. Although thermoplastic fibers may be pre-treated, e.g., by heating, to reduce shrinkage, the fibers used in the present invention may be fibers which shrink on exposure to heat. The fibers used in making the subject composites may comprise fibers which have substantially the same length, or have substantially different lengths, e.g., differing by at least about 100%, 300%, or even 1000% or more. Fibers may be of any length, e.g., from about 0.5 inches to about 8.0 inches, as is desired for a particular material.

The fusible thermoplastic fibers and the infusible reinforcing fibers are combined in a manner that yields a cohesive, manipulatable fabric. The term "fabric", as used herein, includes both nonwoven and woven fabrics, and refers to a two- or three-dimensional material comprising a plurality of fibers. In certain embodiments, the fibers may be organized into yarns or threads, while in other embodiments, substantially individual, or discrete fibers may be employed. A fabric wherein fusible and infusible fibers are substantially intermingled indicates a fabric wherein the fusible and infusible fibers are distributed substantially evenly through each of one or more layers, as distinguished, for example, from a fabric comprising a substantially fusible layer adjacent to a substantially infusible layer wherein some fibers in each layer penetrate the other layer, as can be achieved, for example, by needle-punching or hydroentangling stacked layers. More than one type of fusible fiber and/or more than one type of infusible fiber may be included in the fabric.

In one embodiment, the fabric is needled. Needling is a process known in the art, which may produce a three-dimensional fiber orientation distribution. During needling, some fibers may reorient so that some of the fibers within one layer may become intermingled with fibers from other layers.

In one embodiment, the fabric is hydroentangled. Hydroentangling may involve three primary steps: web forming, hydroentangling, and fabric drying. In the web forming process, the cut fibers are loosely arranged into light-weight webs and physically intertwined or chemically bonded together to produce a substrate with enough mechanical strength to survive the handling techniques used to deliver the web to the hydroentangling process. The hydroentangling process uses high pressure water jets pointed at various angles to the web surface to entangle the fibers from the web surface into the body of the web. The hydroentangled web is then dried. As in most textile processes, each step of the hydroentangling process line may be modified and additional steps may be added by one skilled in the art to achieve the desired fabric properties.

Nonwoven fabrics include felts, webs, batts, and mats, such as a staple fiber web, for example a carded web, or a nonwoven produced by other web forming techniques, for example by air laying, wet laying, or by aerodynamic or hydrodynamic web formation, as discussed in U.S. Pat. Nos. 5,508,093, 5,609,707, 3,676,242, 4,894,280, 5,581,857, and 4,100,324, an article entitled "Super Fine Thermoplastic Fibers" appearing in Industrial and Engineering Chemistry, Vol. 48, No. 8, pp. 1343–1346, and Naval Research Laboratory Report 11437, dated Apr. 15, 1954. Techniques such as needle punching or hydroentangling may be employed to increase the entanglement of the fibers in a nonwoven fabric. A nonwoven fabric, when viewed under magnification, is generally made up of a number of individual, discernible fibers which are randomly entangled to give the web a certain degree of integrity. The degree of integrity is due, at least in part, to the fiber composition, tenacity, fiber length, density and degree of fiber entanglement. The integrity of the web can be further enhanced through interfilament bonding which can be achieved through the use of heat, pressure, adhesives or a combination of the foregoing. U.S. Pat. No. 4,894,280 also describes techniques for forming nonwoven fabrics. As a result of the overlapping and entanglement of the fibers, a nonwoven material may be very porous. The Exemplification below describes techniques which enable the preparation of nonwoven fabrics having fiber volumes greater than 20%, preferably greater than 30%, or even greater than 40%.

Woven fabrics are those fabrics comprised of fibers arranged in substantially regular patterns or alignment, such as by weaving, knitting, or braiding. A woven fabric of the present invention can be prepared by using a weaving machine, for example, a fly weaving machine or a rapier loom, or a knitting machine, such as a circular or flatbed knitting machine. In certain embodiments, a woven fabric may comprise, for example, a fill or weft of reinforcing fibers and a warp of fusible fibers, while in other embodiments, each of the warp and fill may include both fusible and infusible fibers, depending on the desired arrangement of reinforcing fibers in the final product. In certain embodiments, the infusible fibers, taken alone, do not form a knit pattern, e.g., comprise either a woven or braided pattern, or, because of the presence of fusible fibers, form only a partial knit pattern. In certain embodiments, woven materials include woven materials in which some of the fibers have been disordered, e.g., by needle-punching or hydroentangling. In certain embodiments, woven fabrics may be prepared by combining fibers or yarns of thermoplastic fibers, such as polyacrylonitrile fibers, with fibers or yarns of reinforcing fibers, such as carbonized or oxidized polyacrylonitrile fibers, while in other embodiments, fabrics may be woven from a yarn comprising both thermoplastic fibers and reinforcing fibers, e.g., comprising polyacrylonitrile and oxidized polyacrylonitrile fibers.

In certain embodiments, the fusible and infusible fibers of a fabric used in the methods disclosed herein are not intimately associated with each other. For example, in a nonwoven fabric, the fusible and infusible fibers may be substantially randomly arrayed, and in a woven fabric, the fusible and infusible fibers are not ordered except as by the pattern of the weave, e.g., the fibers are not first associated into a yarn which is woven to form a fabric.

The ratio of fibrous thermoplastic material to fibrous reinforcement material useful in the practice of the present invention can vary widely. Since the ratio can effect such characteristics as flexibility, density and porosity of the resulting composite, the ratio can be selected according to the desired finished product. For purposes of guidance, in some applications, the fibrous reinforcement material employed may constitute about 30 to about 95 wt %, or about 40 to about 70 wt %, of the total weight of the resulting fabric. In certain preferred embodiments, the reinforcement fiber represents at least 70 wt %, and even more preferably at least 80 wt %, 90 wt %, 95 wt %, or even more than 98 wt %. In certain other preferred embodiments, the reinforcement fiber represents at least 10 wt %, and even more preferably at least 20 wt %, 30 wt %, or 35 wt %. The proportion desirable for a specific application will depend on the desired characteristics of the final composite, as will be understood by those of skill in the art.

In one embodiment, the fibers may comprise 100% oxidized PAN fiber. In another embodiment, the fibers may be a blend of 10% PAN/90% oxidized PAN fiber blend. In another embodiment, the percentage of oxidized PAN fibers may be in the range 80–100%.

In addition to the base components of fusible and infusible fibers, other constituents may be added to the fabric. There are an array of additives that can modify such functional performance as strength and dimensional stability of the composites or improve certain processing steps. Suitable additives include antioxidants, antistatic agents, compatibilizers, flame retardants, heat stabilizers, impact modifiers, water repellents, lubricants, ultraviolet stabilizers, biocides, pigments and colorants, fillers and reinforcement plasticizers, and viscosity modifiers. Additives which can survive the curing and carbonization steps may be added to the fabric; otherwise, the additives can be added to the carbonized product, e.g., by impregnation, chemical vapor deposition or the like.

For example, binders (powdered or otherwise) may be added to the web to enhance the binding and fusion of the fusible fibers to themselves and to the staple fibers as well.

Additionally, a second resin (such as phenolic resin, amino resin such as melamine resin and urea resin, epoxy resin, phenoxy resin, epoxy-modified polyimide resin, unsaturated polyester resin, polyimide resin, urethane resin, diallylphthalate resin, maleimide resin, fluorocarbon polymers such as Teflon, cyanate resin, and the like, or any combination thereof) may be applied, e.g., in the form of fibers, a coating, a semisolid polymer or solution thereof, a powder, or any other suitable formulation. In certain embodiments, materials such as those disclosed above may be added to the composite after carbonization of the initial fabric.

B. Consolidation of Fabric

After the composite fabric is formed, the fabric may be subjected to conditions of temperature and pressure for a time sufficient to allow intimate contact between the thermoplastic material and the reinforcement material and/or fusion of the thermoplastic fibers. Suitable temperatures are at least as high as the melting point of the thermoplastic material, but not so high as to cause significant levels of thermoplastic degradation or carbonization before the material has a chance to flow.

While not essential, pressure may be employed to aid bringing about the intimate contacting of the thermoplastic material and the reinforcing material. Broadly, pressures from atmospheric up to about 1000 psig are suitable. Preferably, pressures in the range of about 50 up to about 200 psig will be employed. In such embodiments, compressability of the fabric may be a characteristic which influences the qualities of the resulting composite. Pressure may be applied by any suitable means including, for example, by means of pressure rollers, platens, clamps, and other compression devices, or by negative pressure, that is, by means of a vacuum holding device which compresses fabric by suction or vacuum bag to form a compact layer.

The amount of time during which the composite fabric is subjected to elevated temperature and pressure is that amount of time necessary to allow the softened or melted thermoplastic material to come into intimate contact with the reinforcement fibers. In addition, the contact time may be sufficient to allow for any air entrapped in the composite fabric to escape from the composite structure. Broadly, contact for a few seconds up to about 60 minutes may be suitable. Preferably, treatment conditions will be maintained for a period of about 5 seconds to about 30 minutes, which time period is generally sufficient to ensure intimate contact between the thermoplastic material and the reinforcement fiber.

In one embodiment, the melting point of carbon precursor reinforcing fibers is higher than the melting point of the thermoplastic fibers. In another embodiment, the temperature of fusing is such that the thermoplastic fibers are softened or melted, and the stabilized carbon precursor reinforcing fibers are not melted or softened.

The heat required to promote the fusing of the thermoplastic fibers may be applied in any suitable manner. Heat may be applied with heated rolls, heated pressure rolls, heated molds, radiated heat such as heat provided from an infra-red lamp, press platens, and the like. The manner in which the heat is applied to promote the bonding action by the thermoplastic fibrous material is not critical in the practice of the present invention. As discussed above, the layers of fabric must be heated by a suitable heating means at a temperature sufficient to promote the fusing of the thermoplastic fibers in the fabric layers. The temperature can be easily determined by determining the melting point, softening point, or tackifying point of the particular thermoplastic fibrous material used in the fabric. Appropriate melting points are well known in the art. In preferred embodiments, the thermoplastic fibers are fused at least once. The temperature profile of the process may be a gradual heating to a predetermined temperature, rapid heating to a predetermined temperature, or may involve two or more stages, each of which takes place at a predetermined temperature. Multiple stages may occur separately, or, preferably, as part of a single process that includes both fusing and carbonization, as well as optional steps such as crosslinking and stabilization/oxidation, by ramping the temperature between two or more predetermined process temperatures. In addition to heat, other techniques may be employed to promote crosslinking of the thermoplastic material, such as irradiation.

In one embodiment, an oxidation process is used on a PAN fiber for high temperature carbon conversion by crosslinking the polymer. The oxidation process may be a continuous or batch process which stabilizes the PAN fiber for high temperature carbon conversion by crosslinking the polymer. The resultant stabilized or "oxidized" fiber retains most of its PAN mechanical properties required for processing on textile equipment. The oxidation process is preferably completed by heating the fiber to a temperature between 190–260° C. in air.

In embodiments wherein multiple layers or plies of fabric are placed adjacent to each other, (that is, wherein multiple layers are stacked,) needle punching, hydroentangling, or another suitable technique may be employed to promote the intermingling of fibers between fabric layers, thereby increasing the cohesiveness of the multilayer structure. Additionally, the layers of fabric may be fused by heating the thermoplastic material. Preferably the layers also are compacted by pressure or other suitable means to form compacted layers of fabric. Pressure, when applied, is intended to prevent the layers of the fabric from puffing up or to prevent separation of the layers of the fabric. Pressure is preferred and may be applied by any suitable means including positive pressure, for example, by means of pressure rollers, platens, clamps, and other compression devices, or by negative pressure, that is, by means of a vacuum holding device which compresses layers of fabric by suction or vacuum bag to form compacted layers. Many means of compacting the layers of fabric are available and are known to one skilled in the art. Any amount of pressure may be applied to compact the layers of fabric as long as they are securely held together. In some instances, little or no pressure may be required. The application of pressure and heating may be carried out separately or simultaneously, for example, by using heated pressure rolls or heated pressure plates. The pressure can be released after the bonding action of the thermoplastic fibrous material is complete and preferably after cooling the thermoplastic fibrous material or after carrying out subsequent operations such as ply cutting operations, resin impregnation and the like. When pressure is released, the compacted composite fabric remains substantially in its compacted state if the temperature of the composite fabric has been reduced to a point where the thermoplastic fibrous material has hardened or solidified or otherwise formed a rigid bond with other material in the fabric. In certain preferred embodiments, the composite fabric may be formed by placing the layers of fabric adjacent each other in a suitable mold and applying the pressure and heat while the layers of fabric are held within the mold. In other embodiments, the composite fabric may be simultaneously compacted, heated, and cut.

In certain embodiments, the composite fabric may be cooled as desired, preferably cooling to ambient temperature after the compacted layers have been heated to promote or complete the bonding action by the thermoplastic fibrous material. The cooling can be accomplished by any conventional cooling means including forced air, circulating fluids, permitting the fabric to gradually cool to room temperature, and the like. Cooling is carried out to reduce the temperature of the compacted composite fabric below the melting point, softening point, or tackifying point of the thermoplastic fibrous material.

In one embodiment of the present invention, the pressure and heat can be applied with a suitable cutting device. For example, a plurality of layers of the fabric may be stacked sequentially adjacent to each other, and a suitable pressure cutting device having heated cutting surfaces may be applied to the layers of fabric. As the cutting edges of the cutting device engage layers of fabric, pressure is applied to the layers of fabric to form compacted layers of fabric and the compacted layers are heated. The bonding action by the thermoplastic fibrous material is promoted in that region in the layers of fabric where the heated cutting edges engage the layers of fabric.

In an embodiment of the present invention, the fusing operation of the blended fabric or felt may be a calendering process. A calendering process may allow more matrix material to be incorporated in the blend. In an embodiment, the calendering process controls the thickness and density of the material. In a preferred embodiment, the calendering process removes excess heat. Calendering is known in the art to be a process of applying heat or cooling as well as pressure to web and fabric products. A calendering assembly may consist of two heated rollers through which the web product is processed. To melt the polymer, the rollers normally are operated in excess of the melting point to permit the polymer to flow. In one embodiment, the PAN fibers are calendered at the melting point of PAN.

In another embodiment, the composite fabric is directly molded using high-temperature tooling. The directly molded fabric is then heated to carbonization temperatures.

Given the versatility of the present invention and its components it is possible to use numerous combinations of equipment and processing steps to produce the composite sheet material. Temperatures and pressures will vary depending upon the properties of the fusible and infusible fibers chosen. Using the above techniques and other suitable techniques well known in the art, including high-temperature tooling, a composite material may be prepared in any desired shape or configuration for subsequent carbonization. In certain embodiments, the composite material may be oxidized prior to carbonization, depending on the composition of the fusible fibers. When the fusible fibers comprise polyacrylonitrile, oxidation and/or stabilization prior to carbonization may be used. Oxidation and/or stabilization may result in a composite with improved characteristics, such as flexibility, relative to a composite wherein the fabric was not so treated.

C. Carbonization of Consolidated Fabric

After the fusing step, the material may be carbonized to provide a carbon-matrix composite. Alternately, the temperature chosen for carbonizing may be selected to result in the materials exhibiting plastic behavior and thereby being susceptible to mechanical deformation under the application of pressure, e.g., by a calender. Although the temperature used to carbonize the polymeric material should be at least 600° C., it is envisaged that normally it will not exceed 3000° C., above which carbon materials start to vaporize. The resulting material may optionally be graphitized, as is well known in the art. Graphitizing is a thermal process utilizing an inert or vacuum atmosphere to convert the carbonized material into high purity carbon. Higher process temperatures are used to volatilize the remaining 4–8% of non-carbon constituents in the carbonized material, such as PAN fiber. This further processing may advance the molecular structure of the amorphous carbon fiber into an ordered "graphitic" structure. In one embodiment, carbonized PAN fiber may be processed at rates as high as 300° C./min and achieve uniform properties throughout the fiber in as little as 2 minutes of dwell time at the soak temperature. Calendering may also be employed during a fusing operation or as a part of the carbonization to ensure a composite having a substantially constant thickness.

Although not necessary for most applications, a product formed by the method of the present invention may be densified, e.g., by impregnating with polymeric material, such as a high char yield polymer, and reheated to a temperature of greater than 600° C. and, optionally again under simultaneous variable lateral restraint and uniaxial compressive force preferably mechanical load, to convert that additional polymeric material into carbon and thereby further increase the density of the product. Alternatively the density of the product may be increased by, for example, a chemical vapor deposition technique.

The rigidity of the composite fabric is not critical and depends upon several variables. One skilled in the art can optimize and/or adjust rigidity as desired by controlling various parameters, for example, thickness of each ply, thickness of composite, number of plies, type, size and amount of structural, reinforcing fibrous material, type and amount of thermoplastic fibrous material, and optional parameters such as resin impregnation, curing of the resin, stitching and the like.

The density of the composite or fabric may be varied by controlling various parameters. In one embodiment, the density of the composite may be changed by varying the percentage of reinforcing fiber and the percentage of the thermoplastic fibers. In another embodiment, the density of composite may be changed by hydroentanglement or needle punching.

Multilayered materials may also be made by fusing individual sheets, joining them together, e.g., by lamination, and, optionally, carbonizing the joined layers. Alternatively, individual carbonized layers may be laminated or otherwise adhered together, e.g., using an adhesive or resin formulation.

In an embodiment, the porosity of the fabric may be varied by controlling the percentage of reinforcing fiber and the percentage of the thermoplastic fibers. In another embodiment, the porosity of composite may be changed by hydroentanglement or needle punching.

The methods described above may be used to generate composites having porous or non-porous qualities, e.g., by varying the type of weave, the thickness of the fabric, the relative proportions of fusible and infusible fibers, the density of the fibers in the fabric, the relative thickness of the fusible and infusible fibers, or any other suitable characteristic of the fibers or the composite fabric.

D. Exemplary Uses of the Subject Composites

Advantages of the composite fabrics in carbon-matrix composite formation include: the potential for simultaneous densification and carbonization of the composite, eliminating costly time and expense; the formation of a stable, cohesive composite fabric which may be transported and/or stored after fabrication and before fusing and/or carbonization; the capability of conducting a continuous process of fabric formation, molding and/or fusing, and carbonization; and the ability to form desired structures without first forming a structure of reinforcing fibers and then impregnating the structure with carbonizable material. The subject composites may be porous or non-porous, conductive, flexible, or any combination of these qualities suitable for a particular application.

In certain embodiments, the subject composites can be used as a conductive catalyst support in a fuel cell, especially a proton exchange membrane fuel cell (PEM). In such embodiments, the composite will typically be less than 600 microns in thickness, and even more preferably less than 300 microns in thickness. In preferred embodiments the composite will have an electrical conductance of at least 0.01 S/cm, more preferably at least about 0.1, 1.0, 10 or even 100 S/cm, e.g., at operating temperatures. The composite preferably has a smooth surface and modified (flattened) fiber architecture.

In the case of PEM devices, the composites may also be selected to have a permeability coefficient to hydrogen gas of $9.0 \times 10^{-9}$ to $24.0 \times 10^{-9}$ cc·cm/(cm$^2$·sec·cmHg), a permeability coefficient to oxygen gas of $5.0 \times 10^{-9}$ to $11.0 \times 10^{-9}$ cc·cm/(cm$^2$·sec·cmHg), and (optionally) a water content of more than 100 to 250% by weight. In certain embodiments, the subject composites have an air permeability of greater than 3 Gurley seconds, greater than 6 Gurley seconds, or greater than 9 Gurley seconds. In certain embodiments, the PEM composites have a no load thickness of less than 350 μm, less than 300 μm.

In certain embodiments, the subject composites can be used as frictional members, such as in torque converters, brakes, clutches and the like. The subject composites may be used as a dry frictional member or surface, or a wet frictional member or surface. A dry frictional member or surface is defined wherein the friction surfaces are dry and a wet frictional member or surface is defined wherein the friction surfaces are lubricated or cooled by direct contact with a liquid. Where the intended use of the subject composites is as friction members, the composites will preferably be prepared so as to have a dynamic coefficient of friction in the range of 0.05 to 0.6. For instance, the subject composites which can be used in clutch applications include formulations which have a dynamic coefficient of friction greater than 0.08, and even more preferably greater than 0.1. In one embodiment, the frictional member may have a consistent coeffiecient of friction under continuous slip conditions.

In one embodiment of the present invention, the subject composites are used in torque converter clutches. In another embodiment, the subject composites for use in torque converter clutches have a density in the range of 1.3 g/cc to 2.1 g/cc. In yet another embodiment, the contact friction surface has a volume of fiber of greater than 8.7 oz/sq. yard, greater than 14 oz/sq. yard. In another embodiment, the subject composites provide for flow of a lubricant such as oil in passages on and through the composite, significantly increasing the cooling and slip capability of the friction material. In an embodiment, the flow of lubricant is controllable.

In one embodiment, the composite is cut or processed into clutch discs after carbonization. In yet another embodiment, cut preforms of the subject composites are processed into clutch discs directly, and then carbonized.

In certain embodiments, the subject composites may be used for filtration of particulates from fluids. In certain embodiments, the fluid may be hot or corrosive. Fluids may include those involving coal combustion, coal gasification, incineration (e.g., or radioactive, or pathological wastes), catalytic recovery and processing, and chemical and petrochemical processing.

In certain embodiments, the subject composites may be used as electronic and structural reinforcement materials for heavy electrical components, aircraft components, automobile components, electronic equipment components, precision machinery components, semiconductor equipment and the like.

In certain embodiments, the subject composites may be used to attenuate EMI (electromagnetic interference) effects. The composites may be employed as shields, having the capability of absorbing and/or reflecting EMI energy both to confine the EMI energy within a source device, and to insulate that device or other "target" devices from other source devices. In a certain embodiment, the subject composites may be used as seals intended for EMI shielding applications. In preferred embodiments, the subject composites provides electrical surface conductivity while under compression, and provide resiliency allowing the seals to conform to the size of the gap. In preferred embodiments the composite will have an electrical conductance of at least 0.01 S/cm, more preferably at least about 0.1, 1.0, 10 or even 100 S/cm, e.g., at operating temperatures.

High thermal conductivity composites of the present invention can be used in all types of thermal management including electronic packaging, thermal doublers, and heat exchangers are both development and product specialties. In such embodiments, the components and ratios of the subject composition are chosen to provide a product having thermal conductivity of at least 100 W/m-K, and even more preferably 500 W/m-K, 1000 W/m-K or even 2500 W/m-K.

Additional guidance in preparing and processing the mixed fabrics disclosed herein can be found in U.S. Pat. Nos. 4,659,624, 5,556,704, 4,925,729, 4,874,563, 4,479,999, 4,410,385, 5,190,809, 5,994,480, 6,027,794, 4,539,249, 5,000,807, 5,177,840, 5,187,018, 4,818,318, 5,888,609, and 4,871,491.

Exemplification

The invention now being generally described, it will be more readily understood by reference to the following examples which are included merely for purposes of illustration of certain aspects and embodiments of the present invention, and are not intended to limit the invention.

EXAMPLE 1

A composite consisting of 100% PreOx (Sample 1 in Table 1) was prepared. PreOx refers to oxidized PAN fibers. The physical characteristics are in given in Table 1.

EXAMPLE 2

A composite consisting of 90% PreOx/10% PAN (Sample 2 in Table 1) was prepared. The physical characteristics are in given in Table 1.

EXAMPLE 3

A composite consisting of 90% PreOx/10% poly vinyl alcohol (PVA) (h) (Sample 3 in Table 1) was prepared. The physical characteristics are in given in Table 1.

EXAMPLE 4

A composite consisting of 90% PreOx/10% PVA (c) (Sample 4 in Table 1) was prepared. The physical characteristics are in given in Table 1.

Comparison of Samples

Table I compares the physical characteristics of five hydroentangled web samples with the woven and paper products (A–C). PreOX refers to oxidized PAN fibers. Several differences were noted in comparing the graphitized woven and paper products with the original nonwoven trials used to characterize samples #1–4. These distinctions include a thickness between 8–16 mils versus the nonwovens at 18–22 mils and a composite volume fraction of 15–22% versus the nonwovens at 8–10%. These differences result in a higher contact resistance for the nonwoven material.

TABLE I

|  | 1 100% PreOX | | | 2 90% PreOX/ 10% PAN | | | 3 90% PreOX/ 10% PVA (h) | | | 4 90% PreOX/ 10% PVA (c) | | |
|---|---|---|---|---|---|---|---|---|---|---|---|---|
|  | As Rec'd | Carb | Graph | As Rec'd | Carb | Graph | As Rec'd | Carb | Graph | As Rec'd | Carb | Graph |
| Fiber Properties | | | | | | | | | | | | |
| Density (g/cc) | 1.38 | 1.78 | 1.74 | 1.38 | 1.78 | 1.74 | 1.38 | 1.78 | 1.74 | 1.38 | 1.78 | 1.74 |
| Carbon Content (%) | 62 | 90 | 99 | 62 | 90 | 99 | 62 | 90 | 99 | 62 | 90 | 99 |
| Fabric Properties | | | | | | | | | | | | |
| Basis Weight (oz/yd$^2$) | 3.16 | 2.15 | 1.93 | 4.11 | 2.75 | 2.46 | 4.09 | 2.52 | 2.26 | 3.39 | 2.32 | 2.12 |
| Thickness @ 1 psi (mils) | 19.8 | 19.5 | 18 | 22 | 24 | 22.5 | 20.5 | 20 | 18.5 | 21.2 | 21.5 | 20 |
| V$_f$ @ 1 psi (%) | 15.4 | 8.3 | 8.2 | 18.1 | 8.6 | 8.4 | 19.3 | 9.5 | 9.4 | 15.5 | 8.1 | 8.1 |
| Contact Resist. (ohms/mm$^2$) |  | @ 75 PSI | 1.18 |  | @ 75 PSI | 1.26 |  | @ 75 PSI | 1.20 |  | @ 75 PSI | 1.20 |

|  | 5 90% PreOX/10% PAN | | | | | A Paper | B Paper | C "Woven" |
|---|---|---|---|---|---|---|---|---|
|  | As Rec'd | Calender | Post Ox. | Carb | Graph | | | |
| Fiber Properties | | | | | | | | |
| Density (g/cc) | 1.380 | 1.375 | 1.392 | 1.78 | 1.831 | 1.903 | 1.909 | 1.78 |
| Carbon Content (%) | 62 | 62 | 62 | 90 | 100 | 99.3 | 99.4 | 99 |
| Fabric Properties | | | | | | | | |
| Basis Weight (oz/yd$^2$) | 4.11 | 3.82 | 3.81 | 2.57 | 2.30 | 2.57 | 3.91 | 3.36 |
| Thickness @ 1 psi (mils) | 22 | 7.8 | 8.8 | 5.7 | 5.5 | 8.3 | 13.3 | 14.3 |
| V$_f$ @ 1 psi (%) | 18.1 | 47.8 | 41.8 | 33.8 | 30.4 | 21.7 | 20.6 | 17.6 |
| Contact Resist. (ohms/mm$^2$) |  |  |  | @ 70 PSI | 0.80 | 1.05 | 1.14 | 0.819 |

EXAMPLE 5

A portion of sample #2 was calendered and then oxidized at 215° C. for 2 hours and then batch graphitized and tested (sample #5). The calendering process was employed at 260° C. with an applied pressure of 1960 pli (pounds per linear inch) across web. Contact time was limited to less than 30 seconds. The calendering process melted the PAN polymer and permitted the composite to consolidate, thereby increasing the fiber volume fraction from 8.4% to 30.4%. The increased volume fraction of sample 5 resulted in lowering the contact resistance from 1.26 ohms/mm$^2$ to 0.80 ohms/mm$^2$. Sample 5 was carbonized at 50° C./min with an 8-minute soak at 1000° C. Sample 5 was graphitized at 125° C./min with a 600-minute soak at 1750° C.

EXAMPLE 6

Process Steps for HD Fabric

- Fiber Selection—Oxidized PAN (heat stabilized) "reinforcing fiber", and PAN (thermoplastic)
- Sliver Preparation—Convert continuous fiber bundles into broken fibers ranging from 1" to 7" in length. Blend various types of bundles together thru combing equipment to achieve a uniform desired ratio of fibers.
- Yarn Spinning—Convert sliver bundle into yarns with a desired weight and twist per unit length. Perform a secondary twisting operation to ply yarn bundles together.
- Weaving—Process yarn into fabric with a specified # of ends in the machine direction and cross machine direction.
- Scouring—Continuous washing of fabric to remove fiber and weaving sizing agents applied to improve runnability and protect yarn.
- Finishing—Continuous drying of fabric to remove residual water from scouring process.
- Calendering—Application of heat and pressure by means of two or more opposing rolls.
- Oxidation—Continuous curing/stabilization of melted PAN fiber bundles by heating fabric in air for successful conversion during high temperature heat treatment. Convert melted PAN into PreOX.
- Continuous Carbonizing—Pyrolysis reaction completed in an inert atmosphere at high temperature to convert Preox fabric (62% C.) into a carbon fabric (88+% C.).
- Batch Graphitization—High temperature treatment of fabric in roll form to remove remaining non-carbon impurities.

Comparison of Fabrics

For comparison, the composite fabric of Example 6, designated Grade 2000 HD, is compared to Grade 1071 HCB woven fabric (Textron®) which has been used as a gaseous diffusion layer substrate for proton exchange membrane fuel cell applications. As indicated by Table 2, the 2000 HD fabric has a significantly smaller no load thickness and a higher air permeability coefficient, measured in Gurley seconds.

TABLE 2

Comparison of Fuel Cell Fabrics

| Material Property | Units | 1071HCB Fabric | 2000HD Fabric |
|---|---|---|---|
| Physical Data | | | |
| Area Weight | (g/sq. m) | 115 | 118 |
| Electrical tests | | | |
| Contact Resistance @ 49 N/cm$^2$ | (mohm/cm$^2$) | 8.4 | 8.8 |
| In-Plane Resistance | (Ohms/sq) | .276 | .270 |
| Thickness at Varying Loads | | | |
| No Load Thickness | (microns) | 378 | 276 |
| Thickness @ 49 N/cm$^2$ | (microns) | 215 | 194 |
| Compaction | | | |
| (No load to 49 N/cm$^2$) | (microns) | 163 | 82 |
| Chemical Composition | | | |
| Density | (g/cc) | 1.76 | 1.78 |
| Carbon Content | (%) | 99+ | 99+ |
| Air Permeability | (Gurley sec) | 2.7 | 10.5 |

References

The contents of all references and published patents and patent applications cited throughout the application are hereby incorporated by reference.

Equivalents

The embodiments described above are intended to be exemplary, and are not intended to limit the scope of the invention thereto. Many equivalents and variations of the above-described methods and compounds will be apparent to those of skill in the art and are intended to be encompassed by this invention.

We claim:

1. A composite comprising thermoplastic fibers and stabilized carbon precursor reinforcing fibers, wherein the thermoplastic fibers are fused to the reinforcing fibers and wherein the thermoplastic fibers and the reinforcing fibers are carbonized to yield the composite.

2. The composite of claim 1, wherein the reinforcing fibers comprise oxidized polyacrylonitrile fibers.

3. The composite of claim 1, wherein the thermoplastic fibers are high char yield fibers.

4. The composite of claim 1, wherein the thermoplastic fibers comprise phenolic resin, pitch, epoxy resin, phthalonitrile resin, aromatic acetylene-derived polymer, or unoxidized polyacrylonitrile fibers.

5. The composite of claim 1, wherein the thermoplastic fibers comprise unoxidized polyacrylonitrile.

6. The composite of claim 1, wherein the composite comprises at least 30% by weight reinforcing fibers.

7. The composite of claim 1, wherein the composite comprises at least 60% by weight reinforcing fibers.

8. The composite of claim 1, wherein the composite comprises at least 90% by weight reinforcing fibers.

9. The composite of claim 1, wherein the fibers have lengths which differ by at least about 50%.

10. The composite of claim 1, wherein the fibers have lengths which differ by at least about 300%.

11. The composite of claim 1, wherein the fibers have lengths which differ by at least about 1000%.

12. The composite of claim 1, wherein the fibers have substantially identical lengths.

13. The composite of claim 1, wherein the composite has an air permeability of more than 6 Gurley seconds.

14. The composite of claim 1, wherein the composite has an air permeability of more than 9 Gurley seconds.

15. The composite of claim 1, wherein the thermoplastic fibers are interwoven with the reinforcing fibers to form a woven fabric.

16. The composite of claim 1, wherein the thermoplastic fibers and the reinforcing fibers are intermingled in a generally non-ordered arrangement to form a nonwoven fabric.

17. A composite prepared by a method comprising
combining thermoplastic fibers and stabilized carbon precursor reinforcing fibers,
fusing the thermoplastic fibers to the reinforcing fibers, and
carbonizing the thermoplastic and reinforcing fibers to produce a composite.

18. The composite of claim 17, wherein the method further comprises stabilizing and/or oxidizing the thermoplastic fibers.

19. The composite of claim 18, wherein the stabilizing and/or oxidizing step occurs prior to the carbonizing step.

20. The composite of claim 17, wherein the reinforcing fibers are oxidized polyacrylonitrile fibers.

21. The composite of claim 20, wherein the thermoplastic fibers comprise polyacrylonitrile fibers.

22. The composite of claim 17, wherein the thermoplastic fibers are high char yield fibers.

23. The composite of claim 17, wherein the thermoplastic fibers comprise phenolic resin, pitch, epoxy resin, phthalonitrile resin, aromatic acetylene-derived polymer, or polyacrylonitrile fibers.

24. The composite of claim 17, wherein the combining step comprises blending the thermoplastic fibers with the reinforcing fibers to form a non-woven fabric.

25. The composite of claim 17, wherein the combining step comprises weaving the thermoplastic fibers with the reinforcing fibers to form a woven fabric.

26. A composite prepared by a method comprising
forming a precursor substrate comprising polyacrylonitrile fibers and oxidized polyacrylonitrile reinforcing fibers,
fusing the polyacrylonitrile fibers to the oxidized polyacrylonitrile reinforcing fibers, and
carbonizing the polyacrylonitrile fibers and the oxidized polyacrylonitrile reinforcing fibers to produce a composite.

27. The composite of claim 26, wherein the method further comprises stabilizing and/or oxidizing the polyacrylonitrile fibers prior to the carbonizing step.

28. The composite of claim 27, wherein the forming step comprises blending the thermoplastic fibers with the reinforcing fibers to form a non-woven fabric.

29. The composite of claim 27, wherein the forming step comprises weaving the thermoplastic fibers with the reinforcing fibers to form a woven fabric.

30. A method for forming a composite, comprising
combining thermoplastic fibers and stabilized carbon precursor reinforcing fibers,
fusing the thermoplastic fibers to the reinforcing fibers, and
carbonizing the thermoplastic and reinforcing fibers to produce a composite.

31. The method of claim 30, wherein the reinforcing fibers are oxidized polyacrylonitrile fibers.

32. The method of claim 30, further comprising stabilizing and/or oxidizing the thermoplastic fibers.

33. The method of claim 32, wherein the stabilizing and/or oxidizing step occurs prior to the carbonizing step.

34. The method of claim 30, wherein the thermoplastic fibers are high char yield fibers.

35. The method of claim 30, wherein the thermoplastic fibers comprise phenolic resin, pitch, epoxy resin, phthalonitrile resin, aromatic acetylene-derived polymer, or polyacrylonitrile fibers.

36. The method of claim 30, wherein the thermoplastic fibers comprise polyacrylonitrile fibers.

37. The method of claim 30, wherein the combining step comprises blending the thermoplastic fibers with the reinforcing fibers to form a non-woven fabric.

38. The method of claim 30, wherein the combining step comprises weaving the thermoplastic fibers with the reinforcing fibers to form a woven fabric.

39. A conductive catalyst support for a proton exchange membrane fuel cell, the catalyst support comprising
thermoplastic fibers and stabilized carbon precursor reinforcing fibers, wherein the thermoplastic fibers are fused to the reinforcing fibers and wherein the thermoplastic fibers are carbonized to yield the composite.

40. A frictional member comprising
thermoplastic fibers and stabilized carbon precursor reinforcing fibers, wherein the thermoplastic fibers are fused to the reinforcing fibers and wherein the thermoplastic fibers are carbonized to yield the composite.

41. A method of forming a composite comprising:
stabilizing a plurality of carbon precursor fibers,
combining the stabilized carbon precursor fibers with a plurality of thermoplastic fibers,
fusing the thermoplastic fibers to the carbon precursor fibers, and
carbonizing the thermoplastic and reinforcing fibers to produce a composite.

42. The method of claim 41, wherein the method further comprises stabilizing and/or oxidizing the thermoplastic fibers.

43. The method of claim 41, wherein the plurality of carbon precursor fibers comprises polyacrylonitrile fibers.

44. The method of claim 43, wherein the thermoplastic fibers comprise polyacrylonitrile fibers.

45. The method of claim 41, wherein the thermoplastic fibers comprise phenolic resin, pitch, epoxy resin, phthalonitrile resin, aromatic acetylene-derived polymer, or polyacrylonitrile fibers.

46. The method of claim 41, wherein the combining step comprises blending the thermoplastic fibers with the carbon precursor fibers to form a non-woven fabric.

47. The method of claim 46, wherein the combining step further includes consolidating the thermoplastic fibers with the carbon precursor fibers.

48. The method of claim 47, wherein the consolidating step comprises hydroentangling the thermoplastic fibers with the carbon based fibers.

49. The method of claim 47, wherein the consolidating step comprises needle-punching blended thermoplastic fibers and the carbon precursor fibers.

50. The method of claim 41, wherein the combining step comprises weaving the thermoplastic fibers with the carbon precursor fibers to form a woven fabric.

* * * * *